US009493226B2

(12) United States Patent
Karem

(10) Patent No.: US 9,493,226 B2
(45) Date of Patent: Nov. 15, 2016

(54) MULTI-ROLE AIRCRAFT WITH INTERCHANGEABLE MISSION MODULES

(71) Applicant: Abe Karem, Tustin, CA (US)

(72) Inventor: Abe Karem, Tustin, CA (US)

(*) Notice: Subject to any disclaimer, the term of this patent is extended or adjusted under 35 U.S.C. 154(b) by 0 days.

(21) Appl. No.: 14/951,358

(22) Filed: Nov. 24, 2015

(65) Prior Publication Data

US 2016/0075423 A1 Mar. 17, 2016

Related U.S. Application Data

(63) Continuation of application No. 14/205,156, filed on Mar. 11, 2014, now Pat. No. 9,221,532, which is a
(Continued)

(51) Int. Cl.
*B64C 1/06* (2006.01)
*B64C 1/00* (2006.01)
(Continued)

(52) U.S. Cl.
CPC .............. *B64C 1/065* (2013.01); *B64C 1/00* (2013.01); *B64C 1/0009* (2013.01); *B64C 1/061* (2013.01);
(Continued)

(58) Field of Classification Search
CPC .............. B64C 1/00; B64C 1/0009; B64C 1/065; B64C 39/06; B64C 39/10;
(Continued)

(56) References Cited

U.S. PATENT DOCUMENTS 2,504,137 A * 4/1950 Lewis ................ B64C 39/10
244/102 R
3,640,491 A 2/1972 Harrison
(Continued)

FOREIGN PATENT DOCUMENTS

FR 2920745 B1 4/2010
WO 2008/121005 A1 10/2008

OTHER PUBLICATIONS

Ikeda, T., "Aerodynamic Analysis of a Blended-Wing-Body Aircraft Configuration", RMIT University, Mar. 2006, Melbourne, Australia.
(Continued)

*Primary Examiner* — Nicholas McFall
(74) *Attorney, Agent, or Firm* — Fish & Tsang LLP

(57) ABSTRACT

A flight-operable, truly modular aircraft has an aircraft core to which one or more of outer wings members, fuselage, cockpit, leading and trailing edge couplings, and empennage and tail sections can be removably coupled and/or replaced during the operating life span of the aircraft. In preferred embodiments the aircraft core houses the propulsive engines, avionics, at least 80% of the fuel, and all of the landing gear. The aircraft core is preferably constructed with curved forward and aft composite spars, that transfer loads across the center section, while accommodating a mid-wing configuration. The aircraft core preferably has a large central cavity dimensioned to interchangeably carry an ordnance launcher, a surveillance payload, electronic countermeasures, and other types of cargo. Contemplated aircraft can be quite large, for example having a wing span of at least 80 ft.

20 Claims, 5 Drawing Sheets

Related U.S. Application Data continuation-in-part of application No. 13/205,870, filed on Aug. 9, 2011, now Pat. No. 8,967,526.

(60) Provisional application No. 61/372,941, filed on Aug. 12, 2010.

(51) Int. Cl.
*B64C 3/56* (2006.01)
*B64C 39/10* (2006.01)
*B64C 39/02* (2006.01)
*B64D 37/00* (2006.01)
*B64C 1/26* (2006.01)
*B64C 25/10* (2006.01)

(52) U.S. Cl.
CPC . *B64C 1/26* (2013.01); *B64C 3/56* (2013.01); *B64C 25/10* (2013.01); *B64C 39/024* (2013.01); *B64C 39/10* (2013.01); *B64D 37/00* (2013.01); *B64C 2001/0072* (2013.01); *B64C 2039/105* (2013.01); *B64C 2211/00* (2013.01); *Y02T 50/12* (2013.01); *Y02T 50/145* (2013.01); *Y02T 50/433* (2013.01)

(58) Field of Classification Search
CPC ............... B64C 2001/0045; B64C 2211/00; B64C 2039/105
See application file for complete search history.

(56) References Cited

U.S. PATENT DOCUMENTS

| | | | |
|---|---|---|---|
| 3,640,492 A | 2/1972 | Star | |
| 3,869,102 A | 3/1975 | Carroll | |
| 4,417,708 A * | 11/1983 | Negri | B64C 3/40 244/117 R |
| 4,449,679 A | 5/1984 | McComas | |
| 4,662,588 A | 5/1987 | Henderson | |
| 4,736,910 A | 4/1988 | O'Quinn et al. | |
| 5,550,736 A * | 8/1996 | Hay | G05B 9/03 244/76 R |
| 5,616,030 A | 4/1997 | Watson | |
| 5,888,069 A | 3/1999 | Romanoff et al. | |
| 5,897,078 A | 4/1999 | Burnham et al. | |
| 6,070,831 A | 6/2000 | Vassiliev et al. | |
| 6,098,922 A * | 8/2000 | Hahl | B64C 1/0009 244/218 |
| 6,098,927 A | 8/2000 | Gevers | |
| 6,568,632 B2 | 5/2003 | Page et al. | |
| 7,234,667 B1 | 6/2007 | Talmage, Jr. | |
| 7,578,479 B1 | 8/2009 | Colich et al. | |
| 2002/0003190 A1 | 1/2002 | Sankrithi et al. | |
| 2002/0145075 A1 | 10/2002 | Page et al. | |
| 2005/0029400 A1 | 2/2005 | Ouellette et al. | |
| 2006/0249625 A1 | 11/2006 | Matos | |
| 2007/0215746 A1* | 9/2007 | Rieken | B64C 39/06 244/6 |
| 2007/0252029 A1 | 11/2007 | Karem | |
| 2008/0149758 A1 | 6/2008 | Colgren et al. | |
| 2008/0210818 A1 | 9/2008 | Chiu et al. | |
| 2009/0134273 A1 | 5/2009 | Page et al. | |
| 2010/0000991 A1* | 1/2010 | Henry | B64C 3/56 219/679 |
| 2010/0170989 A1* | 7/2010 | Gray | B29C 70/30 244/123.1 |

OTHER PUBLICATIONS

Easley, J., "No Wing F15", Crew's Stories, USS Bennington, Aug. 9, 2001.

* cited by examiner

MULTI-ROLE AIRCRAFT WITH INTERCHANGEABLE MISSION MODULES

This application is a divisional of U.S. application Ser. No. 14/205,156, filed Mar. 11, 2014, which is a continuation-in-part of U.S. Ser. No. 13/205,870, filed Aug. 9, 2011 and issued Mar. 3, 2015 as U.S. Pat. No. 8,967,526, which claims the benefit of priority to U.S. Provisional Application Ser. No. 61/372,941 filed Aug. 12, 2010, each of which is incorporated by reference herein in its entirety.

FIELD OF THE INVENTION

The field of the invention is aircraft.

BACKGROUND

Aircraft development is a capital-intensive and usually lengthy process. Further, because the viability of aircraft depends largely on their weight, conservatism in design can have powerful consequences on the viability of an aircraft. As a result of these two factors and other considerations, any given aircraft tends to be specialized for one role or mission during the design process.

At the same time, aircraft are used on and needed for a variety of missions and roles. Aircraft carry different payloads, including for example, passengers, cargo, sensors, and munitions. Beyond payload, other requirements can shape an aircraft design; for example, some missions require flight in a certain speed regime, while other missions require high fuel efficiency.

Prior art approaches to providing aircraft suitable for conducting specific missions tend to either (i) design a distinct aircraft for a specific mission, (ii) adapt an existing aircraft design for another mission through modifications (iii) attempt to bridge multiple missions in the design stage through an a priori requirement.

Each of these three prior art approaches has weaknesses. The first approach, to design a distinct aircraft for a specific mission, is extremely expensive and often impractical. In general, it has the least potential to meet multiple diverse requirements, therefore limiting its market. The second approach, post-hoc adaptation, is often used in adapting aircraft to new missions similar to the original design mission. Even this approach is expensive and time consuming, however. These difficulties arise in part because of formidable certification and qualification requirements. An example of aircraft post-hoc modification is the transformation of the Lockheed L-188 Electra civilian passenger transport into the Lockheed P-3 Orion naval maritime surveillance aircraft. The original mission (passenger transport) and the new mission (maritime surveillance) have similar flight envelope requirements, in terms of speed and altitude.

The third general approach, attempting bridge multiple missions in the design stage through an a priori requirement, often entails extraordinary costs and engineering effort. An example of this approach would be the Lockheed Martin F-35 family of supersonic fighter aircraft, attempting commonality between the F-35B short takeoff and vertical landing (STOVL) platform, the F-35C carrier based fighter platform, and the F-35A land-based conventional takeoff supersonic fighter platform. The F-35 program is renowned for being billions of dollars over budget and years behind schedule; this results at least in part from attempts to achieve high degrees of commonality among the aircraft in the family. The Boeing competitor to the F-35, as described in U.S. Pat. No. 5,897,078 struggled with similar issues in attempting to bridge diverse mission requirements, while still retaining some degree of parts-commonality among variants.

The '078 patent and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

In summary, aircraft are sometimes designed to be flexible, yet this by-design flexibility can only go so far. Alternatively, different versions of aircraft are designed for specific needs, users, and missions. Only a few prior art aircraft and aircraft related developments known to the inventor have had elements of modularity, and no known prior art aircraft have achieved complete or even extensive modularity.

A few cargo aircraft have carried their cargo in removable cargo containers. Notably, the Fairchild XC-120 Packplane, Miles M.68 Boxcar, and Kamov KA-226 are the instances known to the inventor. FIG. 1A illustrates the Kamov KA-226 helicopter 110, which features a main portion 112 of the aircraft and a removable cargo container 114, which can be configured to carry passengers. FIG. 1B is a side view illustration of the Miles M.68 Boxcar 120, which is a fixed-wing transport aircraft having a main portion 114 of the aircraft, and configured to carry cargo in a removable cargo container 124.

While these prior art aircraft carry their cargo payload in removable containers, they cannot be said to be truly modular aircraft, because they do not change containers to change missions or roles. These prior art aircraft are really predominantly single-role transport aircraft that happen to carry their cargo in an external container that forms part of the aerodynamic fairing of the aircraft, rather than carrying their cargo in containers internal to the aerodynamic fairing of the aircraft like most air freighters.

Aircraft designed to have large cargo bays also do not lend themselves to modularity because the wings need to have structural support across the fuselage. Such structural supports are either positioned above the fuselage (in a high wing configuration) or below the fuselage (in a low wing configuration). In either of those configurations it is not practical to provide readily replaceable wings.

In a similar vein, but for a different kind of aircraft, U.S. Pat. No. 4,736,910 to O'Quinn is directed to a light fighter aircraft with interchangeable nose and tail sections. U.S. Pat. No. 3,640,492 is directed to aircraft having electronics or avionics equipment in removable portions of the aircraft structure or aerodynamic fairing. U.S. Pat. No. 7,234,667 to Talmage describes the division of an aircraft into sections, any of which could be recovered by parachute following an in-flight incident. U.S. Pat. No. 6,098,927 describes an aircraft with a removable fuselage section to increase or decrease the payload capacity of the aircraft. Related to this idea, the practice of extending or contracting fuselage sections by the addition or removal of fuselage plugs is known in the art, and is commonplace in stretched families of transports, including for example, the Airbus A318, A319, A320, and A321, which are substantially just stretched versions of the same aircraft accommodating 107-220 passengers. Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

U.S. Patent Application 2008/0017426 describes a somewhat modular ground vehicle, wherein a core vehicle can attach to a variety of interchangeable elements to serve different roles or missions. However, it should be noted that the field of ground vehicles is substantially different from the field of aircraft, and that aircraft are subject to stricter design constraints. For example, aircraft are highly weight sensitive and aerodynamic drag sensitive and poorly tolerate structural and powerplant inefficiencies, such as those built into the ground vehicle of 2008/0017426 for modularity. A person of ordinary skill in the art would not expect systems and methods that work on ground vehicles to also work on aircraft without significant additional inventive subject matter.

It should be noted that a key constraint for adapting aircraft to serve different roles and missions is the operator interface. As an example, consider the vastly different pilot interfaces found among helicopters, transport aircraft, fighter aircraft, and the ground stations of unmanned aircraft. If an aircraft is to serve multiple roles and missions, it must have a suitable and adaptable interface. This is a formidable challenge, and relatively little known prior art addresses this challenge.

U.S. Pat. No. 5,626,030 to Watson describes a ground-based flight simulator that uses parts of an actual aircraft. However, this reference does not provide a ground control station for an aircraft that is common to a cockpit of an aircraft. U.S. Pat. No. 5,880,669 to Romanoff, et al. also describes an aircraft simulator system, but does not disclose a ground control station for an unmanned aircraft that is substantially identical to a cockpit for a manned aircraft.

Thus, there is still a need for aircraft that are quickly and economically adaptable to different roles and missions, not simply adaptable to different payloads—aircraft that are both modular and multirole.

SUMMARY OF THE INVENTION

The inventive subject matter provides apparatus, systems and methods of a flight-operable, truly modular aircraft.

In a first aspect, a modular aircraft combines an originally deployed wing member that provides at least 15% of the lift during at least some portion of cruise flight, a center section that provides at least 25% of the aircraft during such flight, and has one or both of (a) a forward coupling adapted to couple or decouple a fuselage to the center section during the operational life, and (b) a wing coupling adapted to couple or decouple the wing member during the operational life. Detachable leading and trailing edge couplings can be applied to the center section, and preferably assist in providing lift.

In this first aspect, the fuselage is optional, and where the fuselage is present, it may or may not include a cockpit. Although the aircraft may be shaped as a flying wing, having substantially no empennage, no horizontal tail, and no vertical tail, the optional fuselage may include an empennage, a horizontal tail, and/or a vertical tail.

Modularity can be achieved to a large extent by incorporating many components into the center section. For example, the center section can advantageously contain a propulsive engine, disposed so that it does not extend above or below the center section. In some contemplated embodiments, there are first and second engines disposed on opposite sides of the central cavity. The center section preferably houses at least 80% of all of the fuel, and the aircraft may have a fuel capacity greater than maximum takeoff weight.

The center section can also advantageously include avionics sufficient to operate the aircraft without receiving controls from outside the center section. In some embodiments, it is contemplated that the avionics can operate the aircraft through either or both of ground control and an on-board pilot control. Additionally or alternatively, the center section can include an on-board pilot interface. The center section can also advantageously receive one or more, and preferably all of the retracted landing gear for the aircraft.

In preferred embodiments, the center section is constructed in a manner that produces a centerline central cavity. This can advantageously be accomplished using forward and aft curved composite spars, and right and left inboard ribs. the central cavity can be quite large, for example having a width dimension at least 3% of the span of the aircraft, and a length dimension at least 20% of the length of the aircraft. Not only is the central cavity large horizontally, but it can be large vertically, preferably extending all vertically all the way to the upper skin and lower skins of the aircraft. The central cavity can also advantageously have a cargo dimensioned to interchangeably carry an ordnance launcher, a surveillance payload, and electronic countermeasures.

By placing so much of the flight-critical components in the center section, the wings (or outer wing sections) can be detachable. For example, a detachable wing member having a composite wing spar can couple to the forward and aft spars of the center section using a wing coupling with one or more hardpoints. The wing coupling can carry electrical connections between the center section and the wing member, and in some contemplated embodiments the wings can be hingedly coupled to the center section. Whether or not the wings are detachable, it is contemplated that they can be quite large. For example, aircraft contemplated herein can have a wing span of at least 80 ft, with left and right outer wing members having sufficient stiffness to produce a natural frequency of no less than 6 Hz when airborne.

Other hardpoints are contemplated that removably couple a cockpit module to the center section during an operational life of the aircraft, and that removably couple a tail section to the center section during an operational life of the aircraft.

Various kits are contemplated with one or more of the features discussed above. For example, kits are contemplated that comprise a fuselage, that include a replacement wing member that is not fungible with the originally deployed wing member, that include replacement leading and/or trailing edge portions, and that include center sections having horizontally curved forward and aft composite spars.

In a second aspect, a modular aircraft having originally deployed wing member that provides at least 20% of the lift of the aircraft during at least some portion of cruise flight has (a) center section that includes a centerline cavity, and avionics sufficient to operate the aircraft; (b) a forward coupling adapted to couple or decouple a forward component to the center section during the operational life; and (c) a wing coupling adapted to couple or decouple the wing member during the operational life. The aircraft can have any one or more of the features discussed above.

In a third aspect, a modular aircraft has a center section with a large cargo bay, and left and right wings that are structurally coupled together at least predominantly using supports positioned fore and aft of the cargo bay, rather than above or below the cargo bay. This allows the wings to be coupled to the center section in a mid wing configuration, without adding undue weight to the aircraft. In a preferred mid wing aircraft described below, the cargo bay is at least 6 feet wide, at least 14 feet long, and at least 10 feet high. More preferably, the cargo bay is at least 8, or at least 10 feet wide, independently at least 16, at least 18, or at least 20 feet long, and independently at least 12, at least 14, or at least 16 feet high.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a side view drawing of a prior art rotorcraft with a removable cargo container, while

DETAILED DESCRIPTION

Figure 1A:
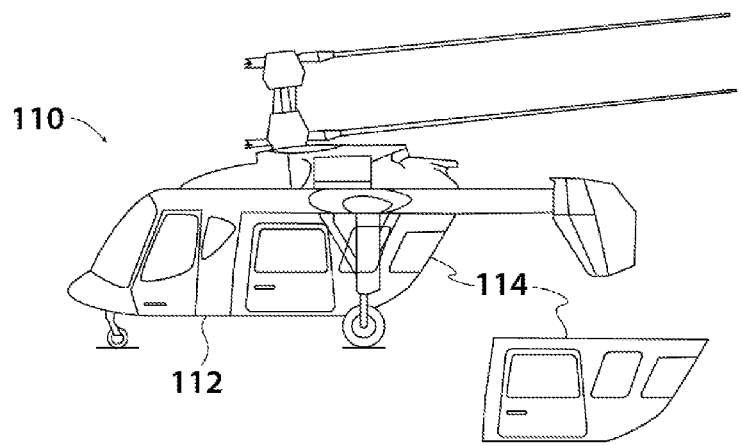
Figure 1B:
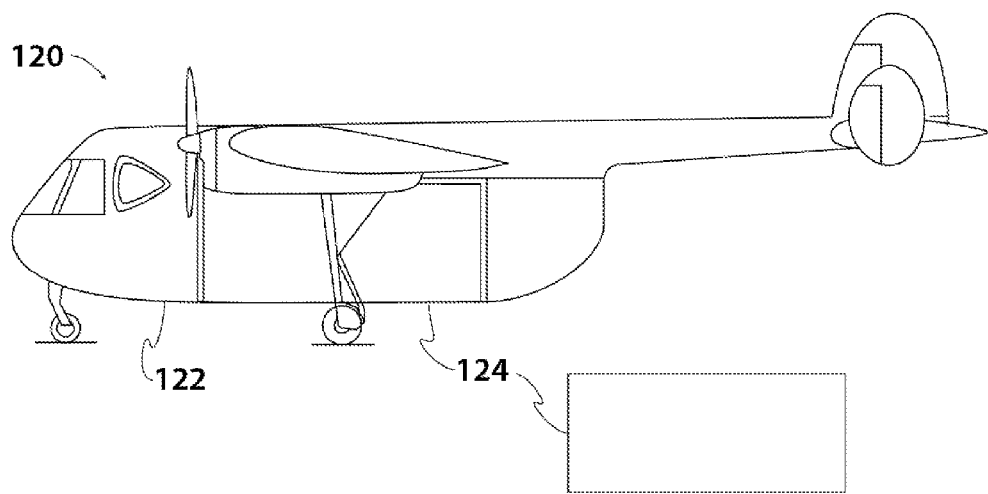
FIG. 1B is a side view drawing of a prior art fixed-wing airplane with a removable cargo container.

Along with the drawing, the following detailed description serves to elucidate various aspects of the present inventive subject matter.

Figure 2:
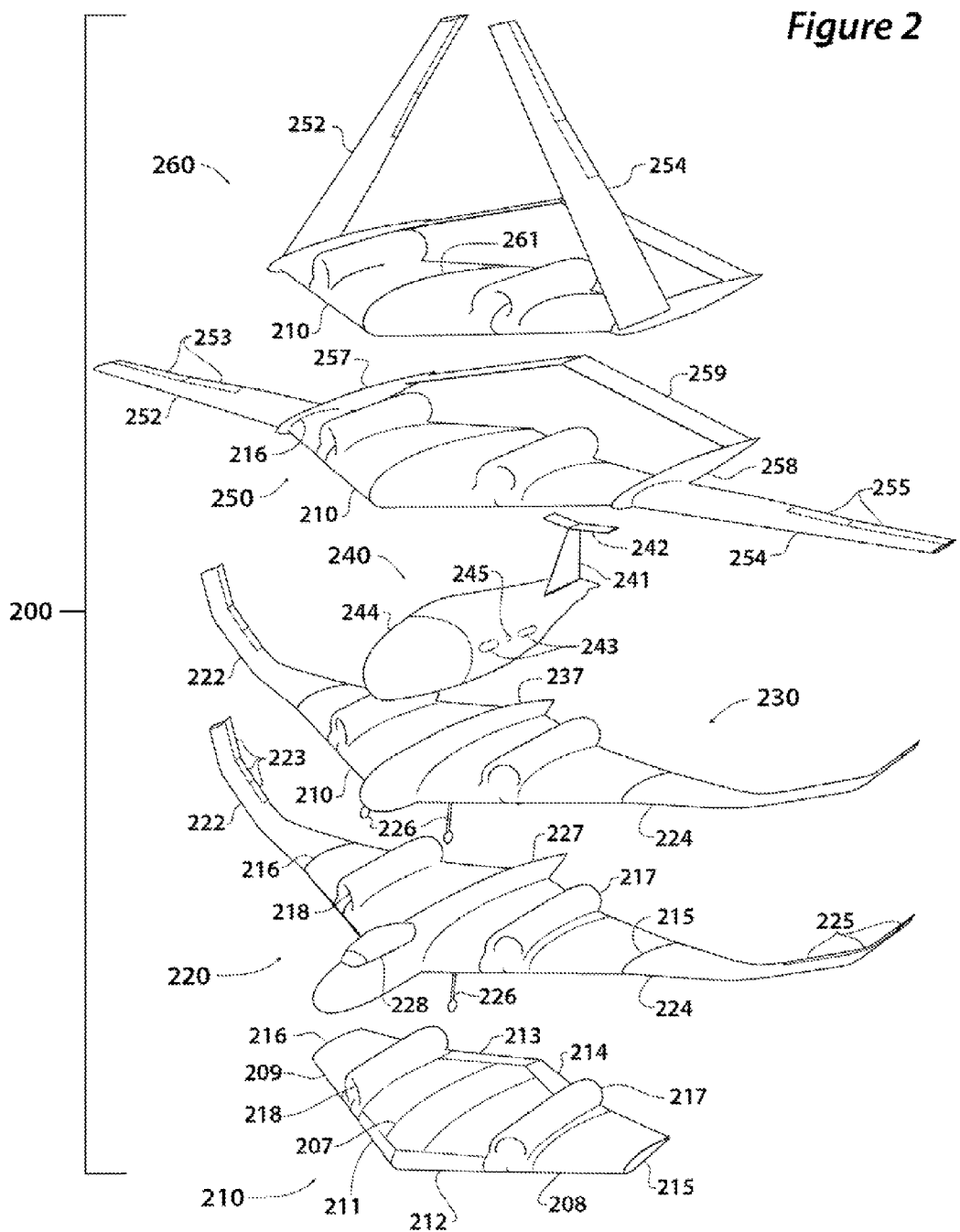
FIG. 2 is a schematic perspective illustration of a preferred modular aircraft kit comprising a center section, various outer wing portions, and various mission modules.

FIG. 2 is a schematic perspective illustration of a preferred modular aircraft kit comprising a center section, various outer wing portions, and various mission modules.

The modular aircraft kit 200 comprises a center section 210. The center section 210 advantageously features a left interface 215 for a left outer wing member and a right interface 216 for a right outer wing member. In especially preferred embodiments, the left and right interfaces 215, 216 are hardpoints configured to allow folding or removal of the outer wing members for compact stowage. The center section 210 is preferably equipped with provisions for propulsive means. A right engine housing 218 and a left engine housing 217 each fair over an inlet, turbofan engine, and exhaust. When coupled to electric power, a flight control system, and a fuel supply, the engine is capable of producing thrust for sustained flight of the modular aircraft. The center section 210 also has a substructure consisting of one or more spars and ribs (not shown). In preferred embodiments, removable aerodynamic or structural elements are attached to this substructure. Center section 210 is equipped with a right leading edge portion 211, a left leading edge portion 212, a right trailing edge portion 213, a left trailing edge portion, and one or more center panels 207. By removing or replacing the center panels 207 and other interchangeable elements, other mission modules or fuselages can be accommodated. The center section 210 also comprises a right wing member 209 and a left wing member 208 for generating lift. Internal to the center section 210 are a number of aircraft systems essential to flight.

A preferred manned aircraft 220 is advantageously composed of elements of the modular aircraft kit 200. A center section 210 is configured to support a fuselage 227 featuring a cockpit 228. The cockpit 228 advantageously includes provisions for a human pilot including an ejection seat, flight controls, an environmental control system, avionics, a clear windscreen or canopy, and instrumentation. The center section 210 supports a right outer wing member 222 comprising right control surfaces 223 attached at the right interface 216 for an outer wing in a manner that supports folding of the right outer wing member 222. Similarly, the left outer wing portion 224 has left control surfaces 225 and is attached at the left interface 215 with the center section. The preferred manned aircraft 220 has no tail surfaces, empennage, horizontal tail, or vertical tail. All aircraft control is affected via control surfaces 223, 225 located on the right and left outer wing members 222, 224. Also shown is landing gear 226 in an extended position, which advantageously retracts into the center section. To install the fuselage 227, which can be viewed as a mission module, the center panel 207 and other parts of the center section are removed (or alternately, are never installed) from the center section 210. The fuselage 227 is structurally attached at hardpoints (not shown) and electrical connections are made facilitate power and data signals between the fuselage 227 and center section 210. Similarly, electrical connections are made between the outer wing members 222, 224 and the center section 210. In preferred aircraft, control surfaces 223, 225 are electrically actuated, but other actuation means such as hydraulic, mechanical, and pneumatic are also contemplated.

A preferred unmanned aircraft 230 is also composed of elements of the modular aircraft kit 200. In this case, the center section 210 is configured to support a mission module 237 advantageously containing payload and mission equipment, including, for example, elements selected from the list containing sensors, cameras, cargo, munitions, fire suppressant, datalinks, antennas, and radio communications equipment. The same outer wing portions 222, 224 are attached to the center section 210 as for the manned aircraft 220. Indeed, the only difference between unmanned aircraft 230 and manned aircraft 220 is the selection and installation of mission module 237 and fuselage 227, respectively. Unmanned aircraft 230 features the same landing gear 226, engines, control surfaces, and systems as manned aircraft 220. Unmanned aircraft 230 is advantageously equipped with a flight control computer containing flight control laws allow autonomous flight without human intervention. Unmanned aircraft 230 is also advantageously equipped with one or more datalinks (not shown) mounted in the mission module 237 or center section 210 allowing control via remote ground control station (not shown). Some preferred aircraft may comprise elements of U.S. application Ser. No. 11/506571.

In preferred modular aircraft kits, other (not originally deployed) mission modules would also be installable in the center section 210. For example, a cargo module 240 would interface with center section 210 via structural hardpoints 243 and an electrical interface 245. The cargo module 240 could comprise a hatch portion 244 for loading or unloading cargo, and an empennage comprising a vertical tail 241 and a horizontal tail 242. Other cargo modules are also contemplated with no empennage wherein all flight control and stability assurance are obtained via control surfaces located on outboard wing portions.

An alternate unmanned aircraft 250 is also composed of elements of the modular aircraft kit 200. In this case, the center section 210 has no fuselage or mission module attached or mounted to it. Instead, all mission equipment is stowed internal to the center section 210, accessible via removable panels or hatches. In this manner, the drag of the central portion of the aircraft is reduced because there is no fuselage or mission module creating additional frontal area. Alternate unmanned aircraft 250 comprises a different right outboard wing portion 252 and a different left outboard wing portion 254 from corresponding components of aircraft 220 and 230. These wing portions 252, 254 can be seen to be substantially entirely flat, not having dihedral or curvature out of plane. Right control surfaces 253 are mounted on the right outboard wing portion 252, while left control surfaces 255 are mounted on the left outboard wing portion. Additionally, a right boom 257 is also attached at the right interface 216 with the center section. The right boom 257 cooperates with a left boom 258 to support an optional empennage 259 for providing pitch and directional stability and control to the aircraft 250. The outboard wing portions 252, 254 are attached to center section 210 by means of folding mechanisms.

The folded alternate unmanned aircraft 260 allows for compact stowage. Here, the right wing portion 252 and left wing portion 254 are rotated up over the center section 210 such that the wing tips approach the aircraft centerline 261.

Whether manned, unmanned, with folding wings or without folding wings, preferred aircraft have a mid-wing configuration, which is used herein to mean that the wings are other than in a high or low position on a fuselage (in our case the center section). As used herein, a low-wing configuration has the left and right wing sections structurally coupled at the bottom of or below the fuselage, and a high-wing configuration has the left and right wing sections structurally coupled at the top of or above the fuselage.

Thus, it is seen that any manner of workable variations can be achieved by substituting various elements of the modular aircraft kit 200. Outer wing portions of different spans, taper ratios, sweeps, airfoils, and planforms can be substituted to tailor aircraft performance to intended missions. It is contemplated that some outer wing portions can have different control surface configurations, with any suitable number of slats, plain flaps, slotted flaps, or split flaps. Some outer wing portions could advantageously be equipped with large embedded antennas as needed for certain missions. Similarly, any number of various fuselages or mission modules could be coupled to the center section 210. Such fuselages or mission modules could accommodate varied payloads with different sizes and packing requirements, including, for example, passengers, pallets, munitions, radars, and RF jamming equipment. In especially preferred modular aircraft kits, the essential systems for aircraft functioning are contained in the center section 210 to allow for rapid reconfiguration. In this manner, the flight control computer, standard communications equipment, navigation sensors, fuel tanks, fuel pumps, generators, electric power system, and engines are located within the center section 210. With contemplated mode of modular operation, an aircraft could begin its operational life with one set of originally deployed outer wing members, and then exchange them for another, non-fungible set of outer wing members selected from an aircraft kit 200.

One list of contemplated missions for a single aircraft with interchangeable mission modules includes: aerial mapping, maritime patrol, police surveillance, aerial spraying, air ambulance, air interdiction, close air support, ground strike, light water bomber for firefighting, refrigerated cargo, cargo accommodations with a roller floor and tie downs, combination cargo and passenger transport, air drop cargo, standard passenger transport, luxury passenger transport, communications relay, radio frequency signal jamming or interception, missile launch, and small vehicle launch.

Figure 3:
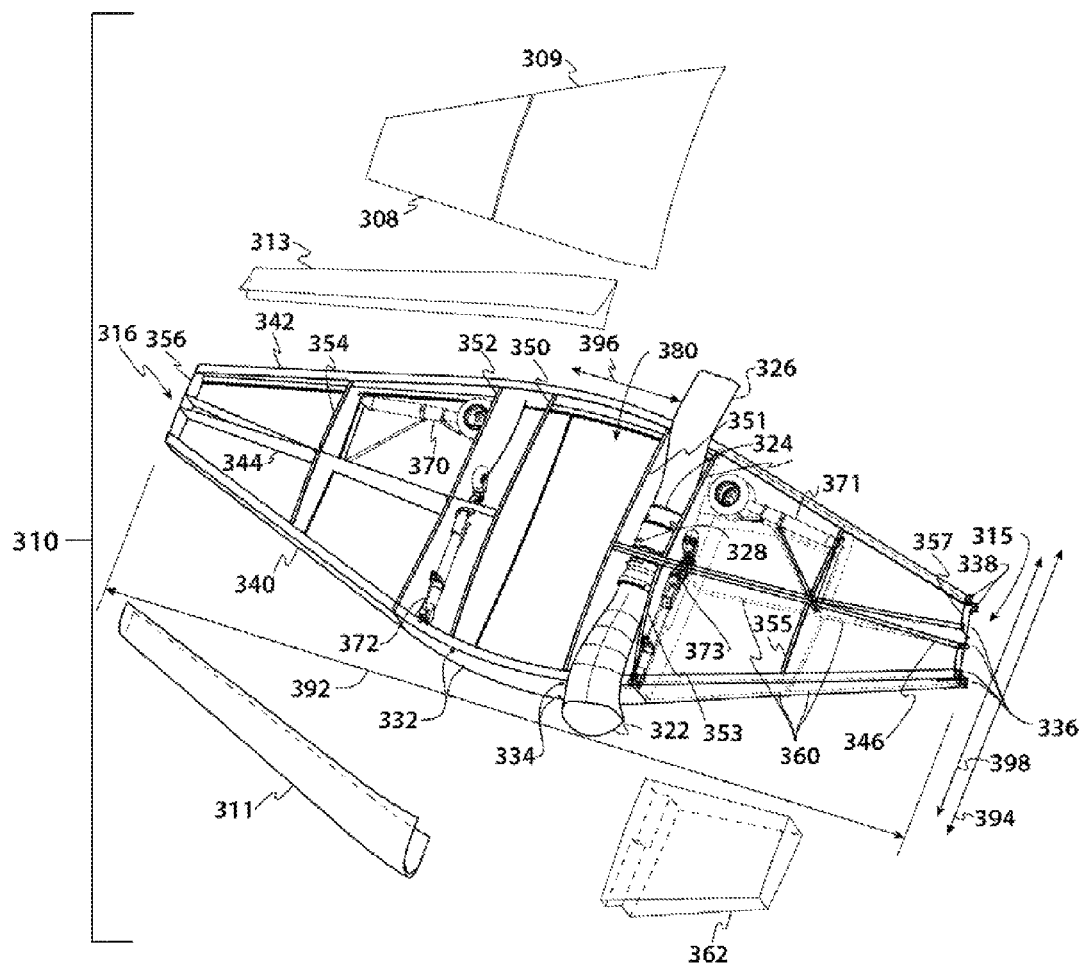
FIG. 3 is a perspective exploded view illustration of an alternate preferred aircraft center section showing the supporting structure and key mechanical systems.

FIG. 3 is a perspective exploded view illustration of an alternate preferred aircraft center section 310 showing the supporting structure and key mechanical systems. The alternate preferred aircraft center section 310 comprises a supporting substructure, including a forward spar 340, an aft spar 342, a right center spar 344, a left center spar 346, right and left inboard ribs 350, 351, right and left second ribs 352, 353, right and left third ribs 354, 355, and right and left outboard ribs 356, 357. In this preferred embodiment, both the forward spar 340 and aft spar 342 are curved and run between a left interface 315 of the center section 310 and a right interface 316. These spars serve as the primary structural members to react forces generated by lifting surfaces on the center section 310 and from outboard wing members (not shown).

The forward spar 340, aft spar 342, right inboard rib 350, and left inboard rib 351 define a central cavity 380 that can accommodate payloads or cargo, and has unobstructed access both upward and downward in a conventional flight orientation (when no skin panels, mission modules, or fuselage modules block this access). This upward and downward access is useful for sensor range of sight, launching munitions, maintenance access, air drop of cargo, and installation of fuselage modules or payloads that require a depth dimension greater than the maximum depth of forward and aft spars 340, 342. The central cavity 380 has a centerline cavity length 398 and a maximum cavity width 396. Notably, to achieve the open central cavity 380, the right center spar 344 must terminate at the right inboard rib 350 while the left center spar 346 terminates at the left inboard rib 351. One of ordinary skill in the art would not contemplate a discontinuous center spar, because the highest bending moments and stresses occur near the center of a wing structure. Normally, structural members have the greatest dimensions (height, depth, and thickness) where bending moments and stresses are highest because this yields a more efficient and lower weight structure. Termination of major structural member (such as the left and right center spars 344, 346) at the point of greatest bending moment does not follow from best engineering practices. At its outer extent, near the right interface 316 of the center section 310, the right center spar 344 splits into a y-shape to better support a right outer wing portion.

Overall, the center section has a center span 392 between the left interface 315 and right interface 316. Depending on the nature of the outer wing portions (not shown) selected for attachment to the center section 310, the assembled aircraft can have a total span that is substantially greater than the center span 392 of the center section 310, including, in preferred embodiments, an overall span that is 2×, 2.5×, 3×, 3.5×, or even 4× the span 392 of the center section 310. The substructure of the center section 310 also has a substructure length 394 between the aftmost portion of the aft spar 342 and the foremost portion of the forward spar 340. In preferred embodiments, the substructure length 394 is greater than the cavity length 398 and between 1.25×, 1.5×, 1.75×, 2×, 2.5×, and 3× the cavity width 396. In this instance, and where other upper limits are not expressly stated, the reader should infer a reasonable upper limit. In this instance, for example, a commercially reasonable upper limit is about 5× the cavity width.

The substructure of the center section 310 advantageously supports aerodynamic fairing elements including a right leading edge portion 311, a right trailing edge portion 313, and upper surface skin panels 308, 309. These fairing elements cooperate to serve as a portion of the center section 310 for generating lift, having a total area (left and right sides) at least equal to the product of the cavity length 398 and cavity width 396.

The center section 310 and its substructure also carry a variety of systems essential to the functioning of an aircraft. In preferred embodiments, the center section 310 supports at least one engine inlet 322, a left side engine 324, a generator 328, and an exhaust duct 326. For clarity, in FIG. 3, only the left side engine 324 is shown. Cooperatively, the left side engine 324 and right side engine (not shown) provide adequate thrust to sustain level flight of an assembled aircraft. In some preferred embodiments, the left and right engines cooperate to provide a maximum thrust that is not greater than 20%, 30%, 40% or 50% of the maximum takeoff weight of the aircraft. In some preferred embodiments, the engine 324 is installed in such a manner that it does not extend above or below the center section 310, even if portions of an inlet or exhaust might extend above the center section. Additionally, a set of left fuel tanks 360 and right fuel tanks (not shown) provide fuel supply to the aircraft engines. An exemplary fuel tank 362 is supported by a combination of spars, ribs, and skin panels when installed in the center section 310. In some preferred embodiments, the total fuel capacity of the aircraft in pounds is greater than the maximum takeoff weight of the aircraft in pounds. Preferred aircraft are also equipped with a four leg landing gear system entirely housed in the center section 310 when retracted, and comprising a right main leg 370, a left main leg 371, a right nose leg 372, and a left nose leg 373. The left and right nose legs 372, 373 provide a steering capability.

For modularity, the center section 310 is advantageously constructed to support interchangeable mission modules, fuselages, and outer wing portions. In preferred embodiments, a left outer wing portion (not shown) is supported by a folding system including a set of right forward folding attachments 336 and right aft folding attachments 338 that rotatably support an outer wing portion, and react the considerable flight bending moments generated by an outer wing portion into the forward spar 340, aft spar 342, and left center spar 346. The center section 310 also supports a variety of mission modules or fuselages by means of hardpoints 332, 334 that allow mission modules to be mechanically fastened in a manner that facilitates quick disconnection and reconnection while still reacting loads.

In especially preferred embodiments, the aft spar 342, forward spar 340, and center spars 344, 346 are of carbon-epoxy composite construction. The caps of the forward spar 340 and aft spar may comprise high modulus carbon fibers in pultruded form. Hardpoints 332, 334 and folding attachments 336, 338 are preferably constructed of high strength metal including for example titanium or steel.

Figure 4:
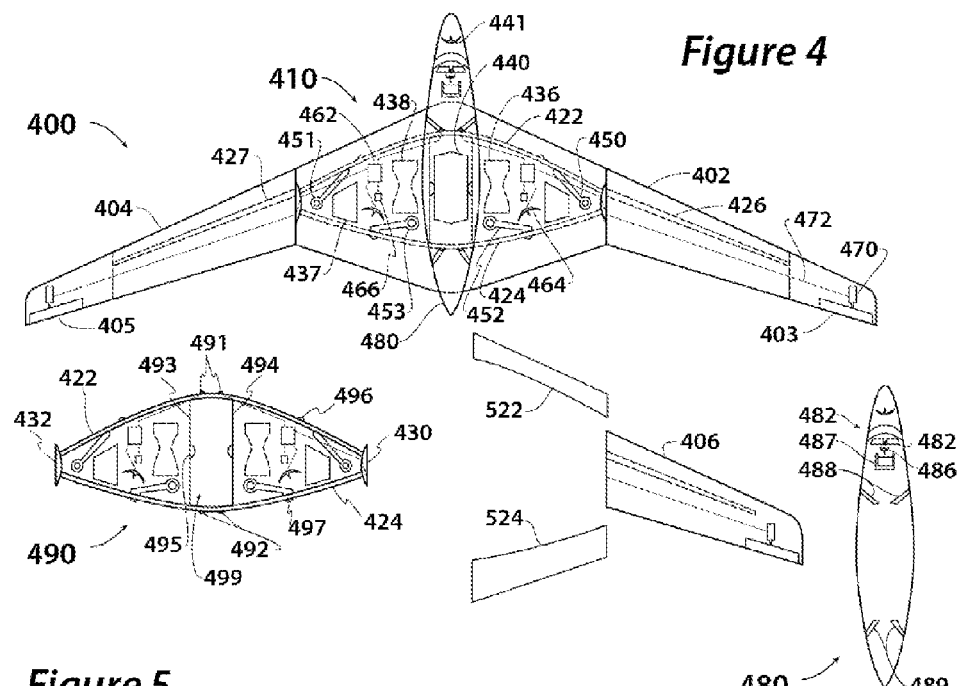
FIG. 4 is a schematic top-view illustration of a preferred modular aircraft.

FIG. 4 is a schematic top-view illustration of a flight-operable, modular aircraft 400 having an operational life. Some contemplated operational lives include 2000 hours 3000 hours, 5000 hours, 10000 hours 20000 hours, 30000 hours, 50000 hours, of flight time. An aircraft center section 410 couples to a right outer wing member 402 and a left outer wing member 404. The outer wing members installed at the start of the aircraft's operational life are said to be originally deployed. The left and right outer wing members are advantageously each sized and configured to provide at least 12, 15, 20, 25, 30, or 35% of the total lift of the aircraft during at least some portion of substantially straight and level cruise flight. In preferred embodiments, the center section 410 is shaped and configured to produce at least 20, 25, 30, 35, 40, and 50% of the total lift of the aircraft during the same portion of the cruise flight. An aircraft flight will typically comprise takeoff, climb, cruise, an optional loiter, cruise, descent, and landing in sequence. A cruise flight condition means sustained self-powered flight at a given cruise altitude and cruise speed. Contemplated cruise altitudes include 10, 15, 20, 25, 30, 35, 40, 45, 50, 55, 60, and 65 thousand feet above sea level. Contemplated cruise speeds correspond to Mach numbers of 0.3, 0.35, 0.4, 0.45, 0.5, 0.55, 0.6, 0.65, 0.7, 0.75, 0.8, 0.85, and 0.9.

The right outer wing member 402 comprises a spar 426 for structural support, a control surface 403 to assist in trim and control of the modular aircraft 400, an actuator 470 to drive the control surface 403, and wiring 472 to carry power and command signals from a flight control computer 462 located in the aircraft center section 410. In some preferred embodiments, the originally deployed left outer wing member 404 is substantially a mirror image of the originally deployed right outer wing member 402, and also comprises a left control surface 405 and left spar 427. It is contemplated that preferred modular aircraft 400 could exchange an originally deployed right outer wing member 402 a replacement right outer wing member 406 that is not fungible with the originally deployed right outer wing member 402. At the same time, flight control laws, as codified and executed in the flight control computer 462, would adapt to this change of wing members as necessary.

The center section 410 is built around an aircraft core 490, an element advantageously configured to enable aircraft system modularity. The aircraft core 490 comprises a forward curved spar member 422, an aft curved spar member 424, and left and right hardpoints 432, 430 that accommodate attachment of outer wing members, folding of outer wing members, and are located in the immediate vicinity of connections for electrical power or signals for powering the outer wing members. The hardpoints 430, 432 serve as wing couplings adapted to couple or decouple outer wing members 402, 404 during the operational life of the aircraft. The right wing hardpoint 430 can be viewed as a coupling that carries load between a composite spar 426 of the detachable right outer wing member 402, and the fore and aft curved spars 422, 424, respectively. The hardpoints 430, 432 can also be advantageously configured as hinges to allow folding of the outer wing members 402, 404 for compact stowage. The aircraft core 490 is also advantageously equipped with forward hardpoints 491 that serve a forward coupling adapted to couple or decouple a fuselage or mission module to the center section 410 during the operational life. In preferred embodiments, the forward hardpoints 491 are attached to the curved forward spar 422. Aft hardpoints 492 may cooperate with forward hardpoints 491 in supporting or coupling a fuselage 480, mission module, or payload to the aircraft core 490 and center section 410.

The preferred modular aircraft 400 is optionally equipped with a fuselage 480. Preferred fuselages 480 are optional and can be coupled or decoupled from the aircraft during the operational life. Fuselage 480 is equipped with a cockpit 482 comprising an on-board pilot interface and means for on-board pilot control, including instrumentation and display screens 482, inceptors 486, and an ejection seat 487. Fuselage 480 is equipped with forward mounts 488 and aft mounts 489 which couple to aircraft forward hardpoints 491 and aft hardpoints 492 to support the optional/removable fuselage 480, and allow the installation or removal of the fuselage in less than two hours. Other fuselages or mission modules are contemplated, including those without cockpits or means for on-board pilot control, which can couple to the aircraft 400 using the same forward and aft hardpoints 491, 492 such that fuselages can be changed out during the operational life of the aircraft 400. In preferred embodiments, the fuselage coupling or the wing coupling that attaches the right outer wing member 402 to the center section 410 also carries electrical connections. In especially preferred embodiments, a quick disconnect connector is located within two feet of a structural hardpoint. Some preferred fuselages 480 or mission modules are equipped with a targeting system 441 such as a radar that is operable by each of a pilot in the cockpit and also by a ground controller.

It is further contemplated that in some especially preferred embodiments, mission modules need not be a single-piece fuselage. The modular nature of the aircraft core 490 having a series of couplings and hardpoints allows it to be viewed as a multi-way receptacle for accessories, including a nose portion of a mission module that could attach to forward hardpoints 491 or other couplings, a tail portion of a mission module that could attach to aft hardpoints 492 or other couplings, optionally a central portion of a mission module, skin panels, a first outer wing portion, a second outer wing portion, and various leading edge and trailing edge pieces. In this manner, mission equipment and mission modules can be rapidly tailored to meet emerging needs, without the requirement of having to change an entire fuselage. In some instances, only the nose portion of a fuselage or mission module might be interchanged, for example to accommodate an alternate targeting system 441.

The aircraft core 490 also has a leading edge coupling 496 to support attachment of a removable leading edge 522, and a trailing edge coupling 497 to support attachment of a removable trailing edge 524. This enables coupling or decoupling right and left leading edge portions during the operational life of the aircraft, where the leading edge portions are configured to assist in providing lift to the aircraft during the at least some portion of cruise flight. The center section 410 of the aircraft 400 comprises an aircraft core 490 as well as a leading edge fairing 522 and trailing edge fairing 524. The aircraft core 490 comprises a right engine 436 and a left engine 438 which cooperate to provide a propulsive force for the aircraft. In preferred embodiments, the engines 436, 438 are installed such that they do not extend above or below the center section 410 skin surfaces. A preferred installation of the right engine 436 involves support from a right inboard rib 494 or from an upper surface extension of a right center spar that does not extend across the central cavity 499 such that the engine that is not structurally supported from directly below the engine.

It is thus seen that, in some preferred embodiments, the central cavity 499 of the aircraft core 490 can be viewed as an open bay entirely inside the aircraft, and supported on only four sides by a fore and aft spar and left and right inboard ribs. In such instances, the central cavity 499 is free from supporting structural members such as spars running laterally across, through, above, or below the central cavity 499. While many such aircraft could benefit from such structural supporting members to provide strength and stiffness near the centerline of the aircraft where bending moments are high, the present inventive subject matter contemplates eliminating all such supporting members in order to create a flexible and modular central cavity 499 which can accommodate any manner of payloads. In preferred embodiments, even skin or door surfaces which may be installed above or below the central cavity 499 to provide an aerodynamic fairing for reduced drag, are non-structural, and carry no more than 2% or 5% of the total bending moment across the centerline of the aircraft.

The aircraft core 490 also contains one or more flight control computers 462, and one or more sensors 466, and communications that cooperate to serve as avionics sufficient to operate the aircraft without receiving controls from outside the center section 410. Preferred aircraft 400 have center sections 410 that contain substantially all of the avionics functionality and are advantageously equipped with fault-tolerant flight control computers and redundant sensors that communicate via an aircraft network bus. Preferred aircraft are also advantageously equipped with one or more communications devices 464, including for example, line-of-sight datalinks, voice radios, beyond-line-of-sight datalanks, transponders, satellite communications radios, and other data radios. In preferred embodiments, the communications devices 464 allows for receiving communications and commands from off-board persons or devices as well as the transmission of flight data and sensor data to off-board persons or devices. In some contemplated aircraft, the flight control computers 462 are capable of receiving inputs or commands from either or both on-board pilot control and ground control such as a ground station. In instances where the flight control computers 462 receive input from both off-board and on-board pilots, the flight control computers 462 advantageously act as an arbiter to determine which set of inputs drive the vehicle core flight control. In especially preferred embodiments, the aircraft core 490 is equipped with substantially all of the systems content required to fly the aircraft 400 except for flight control surfaces and their actuation. This segregation of systems content helps enable overall aircraft modularity.

The aircraft core 490 is further advantageously equipped with left and right forward landing gear 451, 450 and left and right aft landing gear 453, 452 that attach to ribs or spars 422, 424 via hardpoints. These four landing gear members are preferably retractable and are advantageously configured to retract into the center section 410 such that they do not extend further forward of the forward curved spar 422 or further aft of the aft spar 424, and are entirely bounded by the structural elements and skins of the center section 410 when in the fully retracted position. Some preferred aircraft cores 490 resemble a trapezoid, resulting from the cooperation of the forward curved spar 422, aft curved spar 424, right hardpoint 430, left hardpoint 432, and left and right inboard ribs 493, 494 in providing structural support for the aircraft's operations.

The aircraft core 490 is advantageously equipped with a fuel supply 437 such as one or more fuel tanks operationally coupled to the propulsive engines 436, 438. The total fuel supply is preferably distributed both to the right and the left of the central cavity 499, and the engines 436, 438 are preferably disposed on either side of the central cavity 499. It is contemplated that the fuel supply 437 can be sized and configured to house at least 80% or at least 90% of the aircraft total fuel and be housed entirely within the bounds of the aircraft center section.

In preferred embodiments, the horizontally curved forward spar 422 and horizontally curved aft spar 424 are major structural elements bridging the loads generated by left and right outboard wing members 404, 402. Each of the two carries at least 30% and at most 70% of the bending load during at least some portion of substantially straight and level cruise flight. In especially preferred embodiments, the spars 422, 424 are made of carbon-epoxy composite and are constructed in pre-curved molds and run continuously and laterally between a right wing coupling 430 and a left wing coupling 432. A right inboard rib 494 and left inboard rib 493 run longitudinally between the forward spar 422 and the aft spar 424. The aircraft core 490 thus comprises forward and aft curved composite spars 422, 424, and right and left inboard ribs 493, 494, the spars and ribs operatively coupled to provide the centerline central cavity 499.

Figure 5:
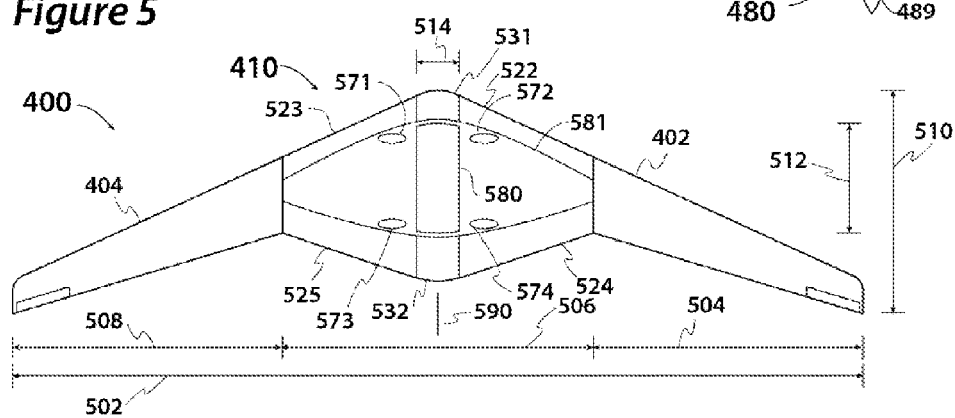
FIG. 5 is a schematic top-view illustration of an alternate configuration of the preferred modular aircraft of FIG. 4.

With reference to both FIG. 4 and FIG. 5, which depict different configurations of the same flight-operable modular aircraft 400, the central cavity 499 has a width dimension 514 and a length dimension 512 as well as a depth and an internal volume. In preferred embodiments, the width dimension 514 is at least 3%, 4%, 5%, 7%, or 9% of the total span 502 of the flight-operable modular aircraft 400, and at most 10%, 15%, or 20% of the span 502. The length dimension 512 is at least 15%, 20%, 25%, 30%, 40%, 50% or 60% of the total length 510 of the aircraft 400 and at least 70% of the length of the aircraft core 490. In preferred embodiments, the central cavity has a cargo coupling 495 that is configured and dimensioned to carry an interchangeable payload 440. Contemplated interchangeable payloads include an ordnance launcher, a surveillance payload, electronic countermeasures, and other sensors, RF equipment, and munitions.

FIG. 5 is a schematic top-view illustration of an alternate configuration of the preferred modular aircraft of FIG. 4, without the optional fuselage 480 installed and without showing many of the internal systems contained in the aircraft core 490. In this view, the aircraft 400 is equipped with no fuselage, a right outer wing member 402, a left outer wing member 404 removable leading edges 522, 523 and removable trailing edges 524, 525. A payload is carried in the internal central cavity 499. The internal central cavity 499 is preferably covered by one or more non-structural skin panels 580 such that the central cavity 499 has no overhead structural support. In preferred embodiments, there is no structural support above or below the central cavity 499. In some embodiments, the bottom of the internal cavity may be covered by moving payload doors. Preferred central cavities 499 extend vertically to an upper skin and a lower skin or non-structural payload doors. Other portions of the aircraft core 490 may be covered by one or more skin panels 581. The skin panels 581 may have provisions for engine inlets 571, 572 and engine exhausts 573, 574 that cooperate to allow air to flow through engines 436, 438 even if the engines 436, 438 have a buried installation and are housed between the upper and lower skins of the center section 410.

The aircraft 400 has a total span 502 that is the sum of a center span 506 associated with the center section 410, a right span 504 associated with the right outer wing member 402 and a left span 508 associated with the left outer wing member 404. The center section extends laterally between the left and right attachments for the outer wing members 402, 404. Left and right are defined relative to a centerline 590 of the aircraft 400. Preferred total spans of the aircraft are between 30 and 180 feet, between 50 and 160 feet, between 70 and 140 feet, and between 90 and 130 feet, or least 80 feet, or at least 100 feet. Due to the modular nature of the aircraft 400, the total span 502 of the aircraft 400 can change during its operational life.

It is contemplated that, despite the considerable total span as described above, some preferred aircraft 400 can be constructed in such a way that the overall vehicle, comprising forward and aft curved composite spars 422, 424 and right and left outboard wing members 402, 404 has sufficient stiffness to produce a natural frequency of no less than 5 Hz or no less than 6 Hz when airborne. This high structural stiffness can advantageously delay or prevent aeroelastic flutter from occurring.

As shown, the aircraft 400 of FIG. 5 is shaped as a flying wing, having substantially no empennage, no horizontal tail, and no vertical tail. Some preferred aircraft are substantially flat, having a dihedral or anhedral of no more than ten degrees, and a maximum thickness-to-chord ratio of no more than thirty percent. Elements of FIG. 4 and FIG. 5 could be combined to form a kit. One exemplary kit could comprise a flight-operable modular aircraft 400 without an originally deployed fuselage, as well as an optional/removable fuselage 480, a right outer wing member 406 that is non-fungible with an originally deployed right outer wing member 404, and a leading edge portion 522.

In preferred embodiments, the wing coupling that attaches the right outer wing member 402 to the center section 410 also carries electrical connections. In especially preferred embodiments, a quick disconnect connector is located within two feet of a structural hardpoint.

Figure 6:
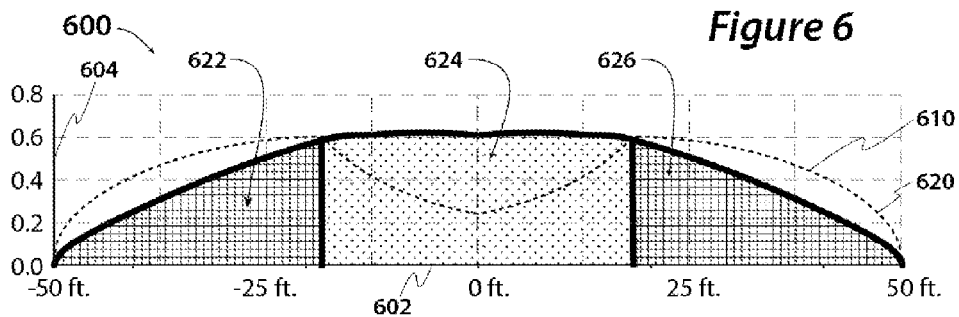
FIG. 6 is plot of the lift distribution of the preferred modular aircraft of FIG. 5.

FIG. 6 is plot of the lift distribution of the preferred modular aircraft of FIG. 5 at a cruise flight condition. The horizontal axis 602 extends from the left semi-span of the aircraft 400 to the right semi-span of the aircraft 400. The vertical axis 604 is non-dimensional and represents the local lift coefficient for curve 610 and the product of local chord and local lift coefficient divided by the chord at the right extent of the center section ($c \times c_1/c_{ref}$) for curve 620. Curve 620 is proportional to dimensional local lift at a wing section. Thus, shaded area 622 represents the total lift generated by the left outer wing member 404, shaded area 626 represents the total lift generated by the right outer wing member 402, and shaded area 624 represents the total lift generated by the center section 410. In preferred embodiments where the aircraft 400 is a flying wing, substantially all of the lift is generated by these three sections together. In especially preferred embodiments, the center section generates between 30% and 70% or between 40% and 60% of the total lift of the aircraft during sustained flight at a substantially straight and level cruise condition.

Figure 7:
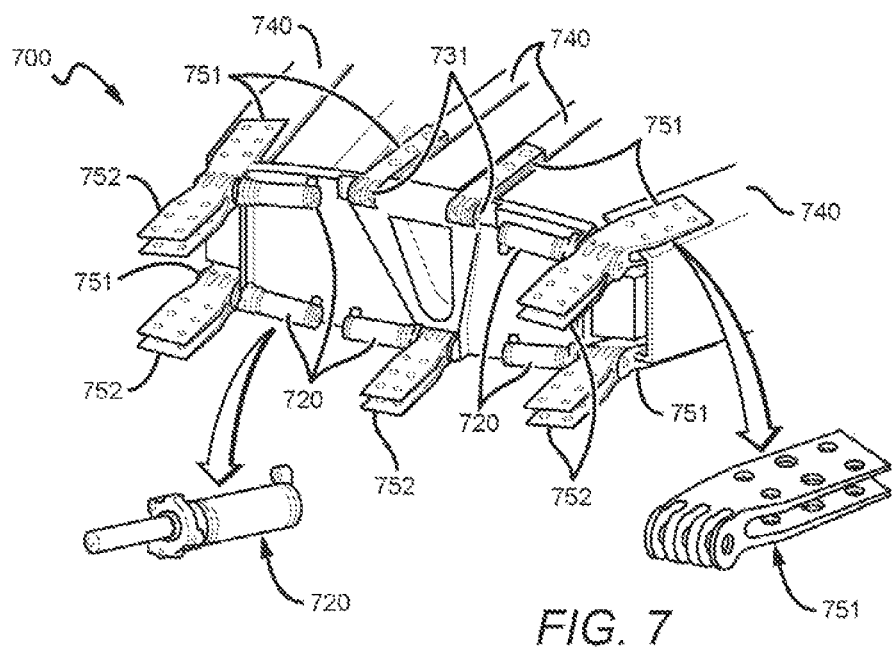
FIG. 7 is a perspective view illustration of an exceptionally preferred aircraft left interface assembly.

FIG. 7 is a perspective view illustration of an exceptionally preferred aircraft left interface assembly 700, 215 or 315 of center section 210, 310 or 410 and a modular outer wing section 224, 254 or 404. The multi-shear, steel or titanium fittings 751, 752, shown as hardpoints and folding attachments 336, 338 or 432 carry loads from the outboard modular outer left wing to the center section. The inboard fittings 751 are permanently fastened to the inboard spars 740 and the outboard fittings 752 are permanently fastened to the outboard spars. The inboard fittings 751 and outboard fittings 752 are mechanically fastened via reusable attachment hardware. Each inboard and outboard fitting pair is joined via a pin which is rapidly inserted to or extracted from the fittings 751, 752 via a hydraulic actuator 720. Extraction of the hydraulic pins 720 from the fittings 751, 752 allows the especially preferred outer left wing module 224, 254 or 404 to fold. Removal of two additional pins 731 allows complete removal or replacement of the outer left wing module. All hardware used to fold, remove and assemble the outer left wing is reused for the continued operation of the aircraft; no hardware is modified, repaired or discarded as part of the folding, removal of replacement.

Figure 8:
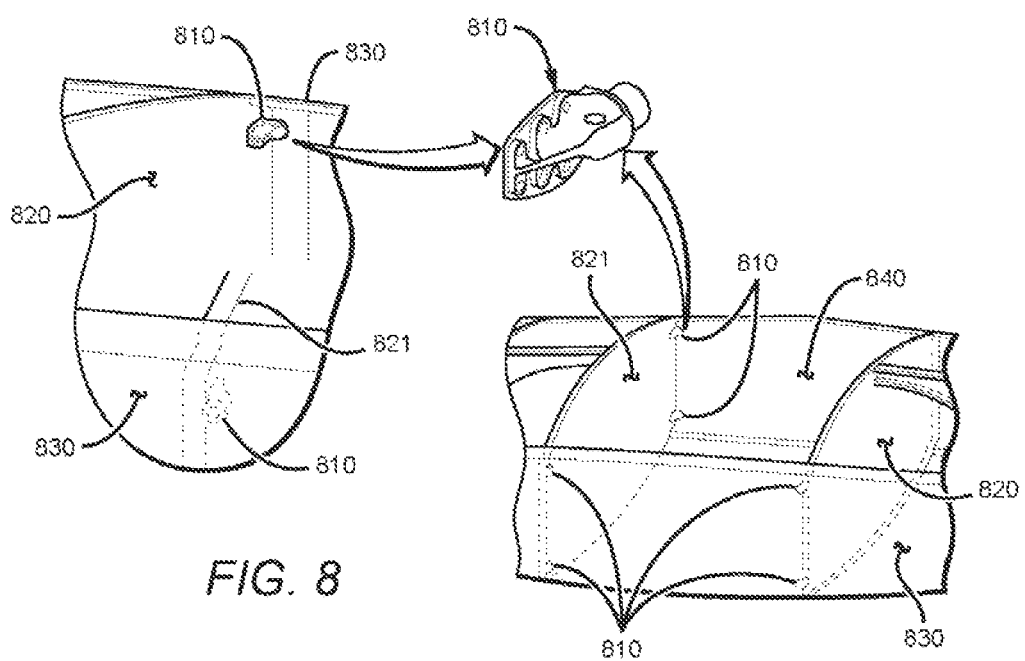
FIG. 8 is a perspective view illustration of an exceptionally preferred forward and aft center section hardpoints.

FIG. 8 is a perspective view illustration of an exceptionally preferred embodiment of forward and aft hardpoints 810, 332, 334, 491 or 492 of center section 210, 310 or 410. Four of the aluminum or titanium hardpoints 810 are located on the forward curved spar 830, 340 or 422 and four (preferably identical hardware) are located on the aft curved spar 840, 342 or 424. Each attachment is permanently fastened to the primary structure via the forward 830 or aft 840 spar and the left inboard rib 820, 351 or 493 or the right inboard rib 821, 350 or 494. The front and aft hardpoints provide for attachment and removable of fuselage 480 and provide for attachment and removable of an interchangeable payload 440 in the aircraft open central cavity 380 or 499 via reusable attachment hardware. All hardware used to remove and assemble the fuselage is reused for the continued operation of the aircraft; no hardware is modified, repaired or discarded as part of the removal of replacement.

At a nominal, non-accelerating cruise flight condition, the aircraft lift is approximately equal to its weight. If the aircraft is not refueled or resupplied in flight, the weight in cruise is less than the weight at takeoff. Aircraft conventionally have a maximum takeoff weight, which is the greatest weight at which the aircraft can safely takeoff. Under normal operation, without refueling or resupply, the aircraft weight will continuously decrease until landing as fuel is burned. Powered aircraft are conventionally equipped with a fuel supply capable of holding a maximum quantity of fuel. It is contemplated that some preferred aircraft 400 without provisions for aerial refueling could be equipped with a fuel supply 437 sized and dimensioned with fuel capacity greater than maximum takeoff weight. In this manner, the aircraft would be not be able to takeoff with its fuel supply 437 filled to capacity. One of ordinary skill in the art simply would not think of over-sizing the fuel supply to such a degree, because there is no perceptible benefit. The present inventive subject matter, however, contemplates that an aircraft core 490 could accommodate future growth of an aircraft 400 in this manner.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A flight-operable, modular aircraft comprising:
   a center section having a physical upper component below which resides a cargo bay, and horizontally curved fore and aft spars positioned fore and aft of the cargo bay, respectively; and
   left and right wings that are structurally coupled together at least predominantly through the fore and aft spars.

2. The aircraft of claim 1, wherein the wings are coupled to the center section in a mid-wing configuration.

3. The aircraft of claim 1, wherein the wings are coupled to the fore and aft spars using reusable attachment hardware comprising at least one of pins and bolts.

4. The aircraft of claim 3, wherein the wings are folding wings.

5. The aircraft of claim 1, wherein the fore spar has hard points for connecting a nose section, and the aft spar has hard points for connecting a tail section, and each of the hard points uses at least one of pins and bolts.

6. The aircraft of claim 1, further comprising left and right ribs structurally coupled to the fore and aft spars, and wherein the cargo bay is bounded by the fore and aft spars, and the left and right ribs.

7. The aircraft of claim 5, wherein bending loads resulting from the nose and tail section are structurally carried by left and right ribs.

8. The aircraft of claim 1, wherein the fore spar extends across an entire first width of the center section.

9. The aircraft of claim 8, wherein the fore spar is curved across the entire first width, and comprises a composite material.

10. The aircraft of claim 8, wherein the aft spar extends across an entire second width of the center section.

11. The aircraft of claim 1, further comprising right and left inboard ribs, and wherein the center section has a trapezoidal shape defined by the right and left inboard ribs and the fore and aft spars.

12. The aircraft of claim 1, wherein the center section provides a least 25% of the lift of the aircraft during at least some portion of cruise flight.

13. The aircraft of claim 1, wherein the aircraft is shaped as a flying wing, having substantially no empennage, no horizontal tail, and no vertical tail.

14. The aircraft of claim 1, wherein the center section includes an engine that provides a propulsive force for the aircraft, and wherein the engine does not extend above or below the center section.

15. The aircraft of claim 1, wherein center section includes avionics capable of operating the aircraft through both ground control and on-board pilot control, and fault-tolerant flight control computers and redundant sensors that communicate via an aircraft network bus.

16. The aircraft of claim 1, further comprising first, second, and third landing gear that retract into the center section.

17. The aircraft of claim 1, further comprising a cockpit, and a targeting system operable by each of a pilot in the cockpit and a ground controller.

18. The aircraft of claim 1, further comprising a supply of fuel, wherein the center section is an interchangeable mission module that houses at least 80% of onboard fuel.

19. The aircraft of claim 1, further comprising a wing span of at least 80 ft, with left and right outer wing members having sufficient stiffness to produce a natural frequency of no less than 6 Hz.

20. The aircraft of claim 1, wherein the left and right wings have sufficient stiffness to produce a natural frequency of no less than 6 Hz.

* * * * *